United States Patent [19]
Klayum et al.

[11] 3,728,467
[45] Apr. 17, 1973

[54] BURIED-TYPE SPLICE CASE

[75] Inventors: Milton A. Klayum, Wood Dale; Chester E. Pierzchala, Wheaton, both of Ill.

[73] Assignee: Reliable Electric Company, Franklin Park, Ill.

[22] Filed: Nov. 9, 1971

[21] Appl. No.: 196,911

[52] U.S. Cl. ..................174/38, 174/51, 174/60, 174/76, 174/77 R, 174/78, 174/92
[51] Int. Cl. ................................................H02g 9/02
[58] Field of Search ..................174/17 R, 37, 38, 174/51, 60, 65 SS, 71 R, 72 R, 76, 77 R, 78, 87, 91, 92, 93

[56] References Cited

UNITED STATES PATENTS

| | | | |
|---|---|---|---|
| 477,218 | 6/1892 | McLeod | 174/38 X |
| 900,382 | 10/1908 | Joynes | 174/87 X |
| 954,842 | 4/1910 | Woods | 174/60 X |
| 3,431,349 | 3/1969 | Hamilton | 174/38 |
| 3,435,124 | 3/1969 | Channell | 174/38 |
| 3,557,299 | 1/1971 | Dienes | 174/38 |

FOREIGN PATENTS OR APPLICATIONS

| | | | |
|---|---|---|---|
| 964,695 | 5/1957 | Germany | 174/60 |
| 1,930,655 | 12/1970 | Germany | 174/92 |

*Primary Examiner*—Laramie E. Askin
*Attorney*—Roy H. Olson et al.

[57] ABSTRACT

A buried-type ready-access splice closure comprises a dielectric base with a pair of openings for receiving the opposite runs of a loop of cable. The base is split along a parting region that passes through the centers of the openings. The base also has clamping means for clamping the runs of the cable and for grounding the shield of the cable outside of the base. The loop of cable has its coverings stripped away to expose the insulated core wires for splicing to service wires. The loop is supported by a bracket that is attached to the base and to the clamping means, and the loop and bracket are enclosed by a cover that is removably clamped to the base. Additional openings are provided in the base for receiving the service wires which may be sealed to the base by a nut and bushing arrangement. The split base permits ready substitution of another cable or extension of the cable to another location if the splice case is originally used as a dead end housing for the cable.

5 Claims, 12 Drawing Figures

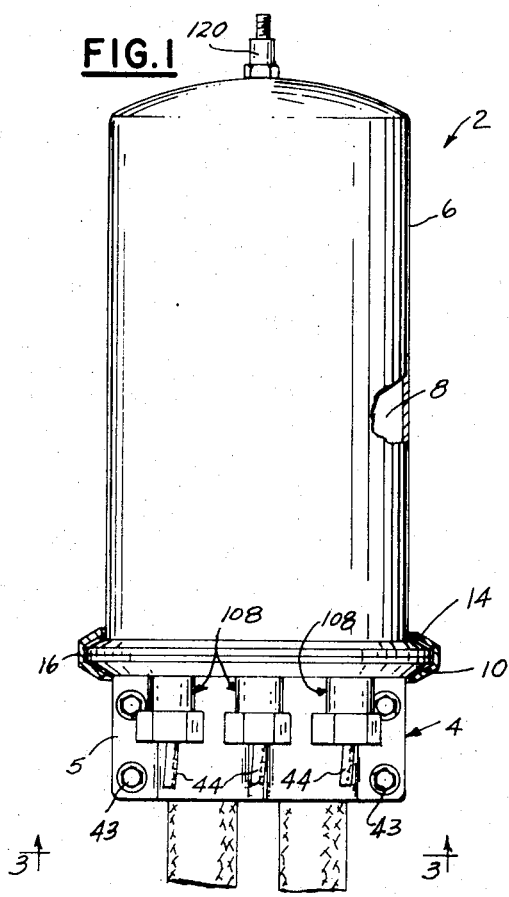
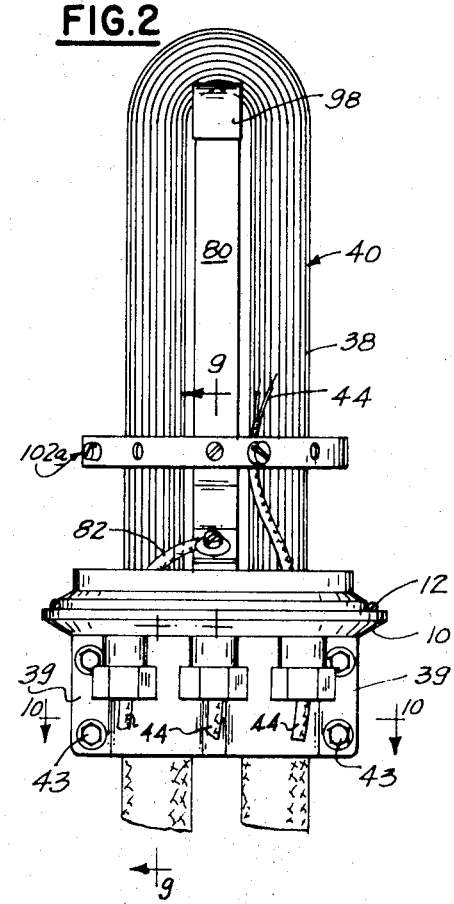
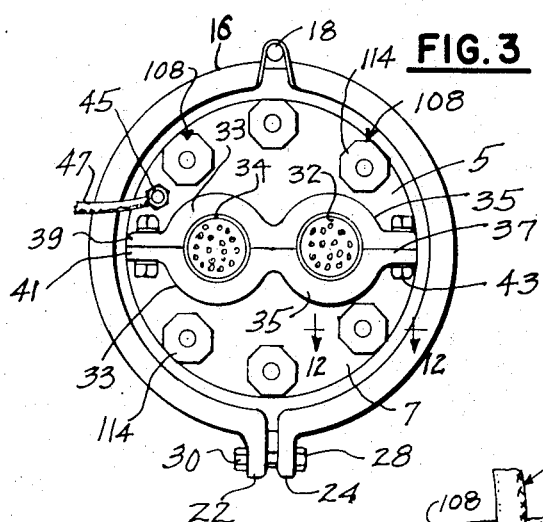
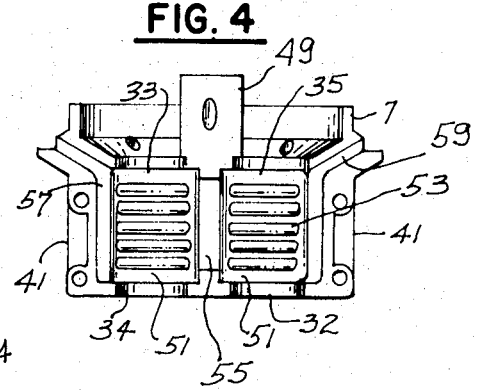
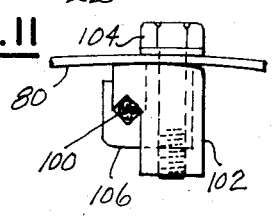
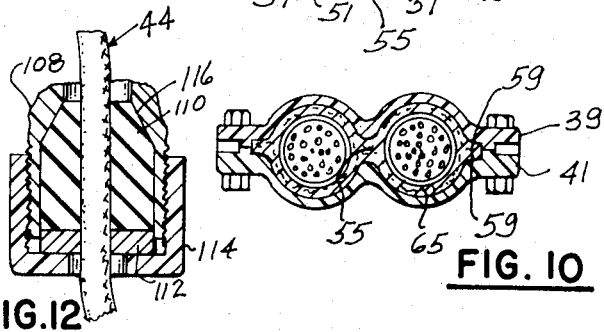

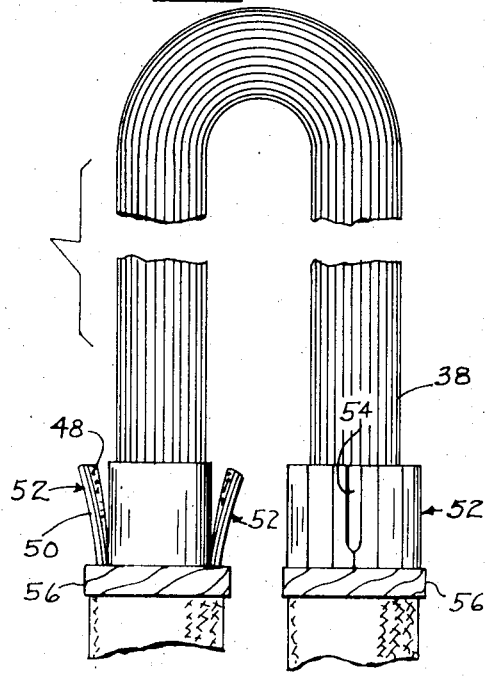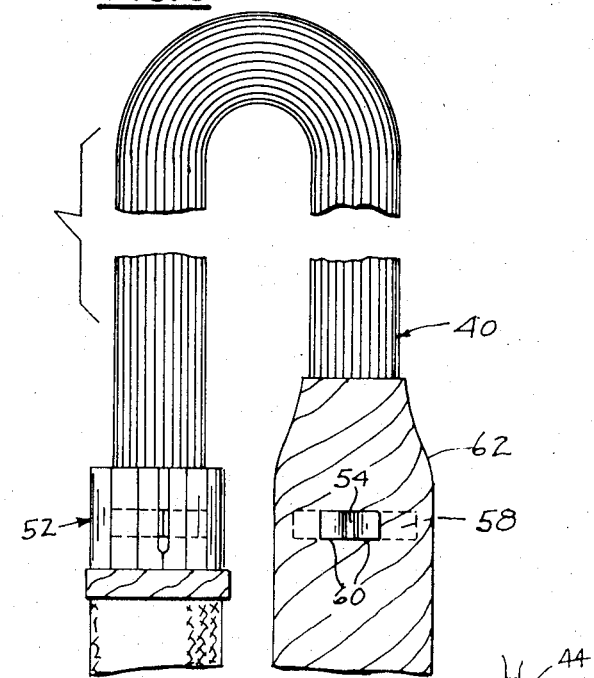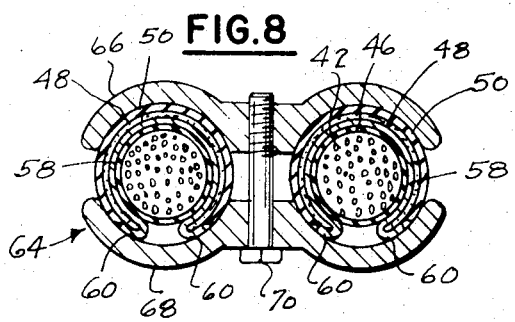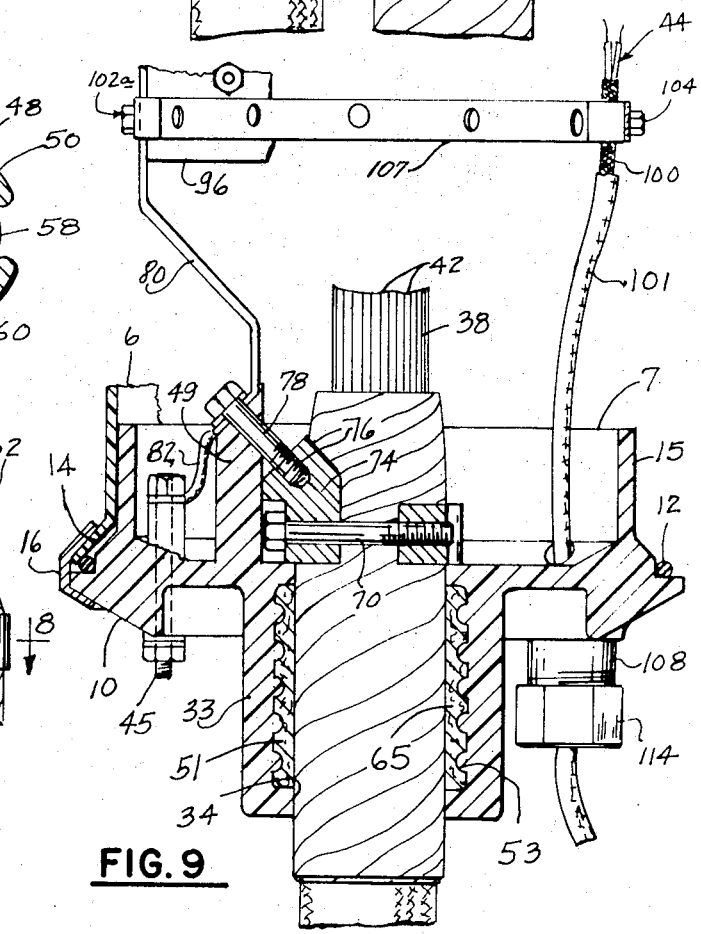

BURIED-TYPE SPLICE CASE

CROSS-REFERENCE TO RELATED APPLICATION

Reference may be had to our copending application Ser. No. 196,024, filed Nov. 5, 1971, entitled "Buried-type Splice Case."

BACKGROUND OF THE INVENTION

This invention relates to buried-typed splice cases for use in the distribution of service lines from a cable, particularly a cable of the type used for telephone communications.

In the installation of underground telephone cables, it is a common practice to utilize above-ground enclosures that embody a splicing or tapping loop of cable at which the service wires are connected to the core wires of the main cable. In some areas it is often undesirable or impractical to have above-ground enclosures. Accordingly, the need arises for a splice case which is suitable for subterranean installation so that the main cable and service drops need not rise above the ground. However, a totally buried splice case should be of a construction which not only seals the splicing chamber from moisture and other contaminants, but also is one in which ready access may be had to the splicing chamber for addition or removal of service wires as needs arise. Another problem in the use of buried splice cases lies in the need for flexibility for use. For instance, a splice case may sometimes serve as a "dead end" for a cable. Later it is desired to extend the cable beyond the dead end, and to do so often requires extensive time and replacement of the dead end enclosure.

OBJECTS AND SUMMARY OF THE INVENTION

An object of the present invention is to provide a buried-type splice case for distributing service wires, the splice case being readily accessible for the purpose of disconnecting or extending service lines with a minimum of effort.

It is a further object of the present invention to provide a splice case of the type stated which is effectively sealed to prevent the entrance into the splicing chamber of moisture and other contaminants. Moreover, the cover for the splicing chamber is not only sealed to the base of the unit, but is capable of rapid removal as by a quickly detachable clamp ring.

A still further object of the present invention is to provide a splice case of the type stated in which an effective ground is provided for the cable shield and the shields of the service wires.

A further and important object of the present invention is to provide a splice case of the type stated in which a new cable can be readily substituted for an existing cable within the case. Also, if the cable is dead ended within the splice case, extension of the cable therebeyond is readily facilitated. These advantages of the present invention are brought about by fact that the base of the device has a pair of openings for receiving the runs of the cable, and the base is split along a parting line running through the two openings. The base sections are bolted together at marginal flanges so that they may be readily separated. A sealing arrangement is provided at each of the two openings which does not inhibit separation of the base sections nor prevent resealing the base sections.

The base has mounted thereon an inner sheath clamp for engaging the inside surface of the grounding shield of the cable. An outer sheath clamp is provided for engaging the outer sheath of the cable and the inner sheath clamp, whereby a conductive connection is established between the inner and outer sheath clamps. The cable has a splicing-loop at which the insulated core wires of the cable are exposed as by stripping away the metallic grounding shield and the inner and outer sheaths of the cable. A mounting bracket is attached to the base and is in conductive connection with the sheath clamps, and a grounding harness provides a ground connection extending through the base for external connection to a ground wire. The bracket has an insulated end remote from the base for supporting the core wires of the loop at the turn of the loop which extends substantially from the base to the insulated end of the bracket and back again to the base. The base has tubular projections that form ports for receiving service wires to be spliced with the core wires. Each service wire port is sealed by a nut and bushing structure. Grounding clamps for the service wire shields are provided on the mounting bracket. A cover is removably and sealingly attached to the base.

BRIEF DESCRIPTION OF THE FIGURES

FIG. 1 is an elevational view of a splice case constructed in accordance with and embodying the present invention;

FIG. 2 is a view similar to FIG. 1 but with the cover removed;

FIG. 3 is a view as seen from line 3—3 of FIG. 1;

FIG. 4 is a top plan view of one of the base sections;

FIG. 5 is a fragmentary elevational view showing a stage in the installation of the inner sheath clamp onto the cable;

FIG. 6 shows a further stage in the assembly of the inner sheath clamp onto the cable;

FIG. 7 is a fragmentary elevational view of a portion of FIG. 4 and showing a further assembly stage in which the outer sheath clamp is in place on the cable;

FIG. 8 is a fragmentary sectional view taken along line 8—8 of FIG. 7;

FIG. 9 is a fragmentary longitudinal sectional view on an enlarged scale taken approximately along line 9—9 of FIG. 2 but showing a fragmentary portion of the cover and clamp;

FIG. 10 is a fragmentary sectional view taken along line 10—10 of FIG. 2;

FIG. 11 is a detail of the service wire grounding connector; and

FIG. 12 is a fragmentary sectional view taken along line 12—12 of FIG. 3.

DETAILED DESCRIPTION

Referring now in more detail to the drawings, there is shown a splice case 2 having a base 4 and a cover 6 which together define a splicing chamber 8. The base 4 is a suitable dielectric moisture impervious plastic and is made up of two sections 5, 7 that are assembled in face-to-face engagement. When so assembled the base has a surrounding cylindrical flange 10 which receives an O-ring 12. The cover 6 is a cylindrical member of plastic or metal and includes at one end a surrounding conical flange 14, which telescopes with the inner axial end 15 of the base 6 and which engages the O-ring 12. The back side of the flange 10 is of a conical shape substantially companion to that of the flange 14. The base 4 and cover 6 are maintained in sealed but removable engagement by an articulated clamp ring 16 having generally semi-circular sections secured together at a hinge 18 (FIG. 3). The interior surfaces of the clamp ring sections are generally conical in shape corresponding to the external shapes of the flanges 10, 14. When the clamp ring is closed, as in FIG. 3, the cover and base 4 are tightly sealed in end-to-end relationship. The free ends 22, 24 of the clamp ring sections are tuned radially outwardly, and one of the ends 22 has a hole for receiving a bolt 28 that is in the other section 24. A nut 30 that is threaded onto the bolt 28 draws the ends 22, 24 together, thereby forming a clamp and a seal at the O-ring 12.

Formed in the base 4, are side-by-side bores or openings 32, 34 into the splice chamber 8. The openings 32, 34 are defined by semi-circular axial bosses 33, 35 on each of the base sections 5, 7. The bosses 33, 35 of the respective sections meet along a parting plane region 37. Laterally of the bosses 33, 35 the sections 5, 7 are provided with flanges 39, 41 which also abut at the parting plane 37. Bolts and nut assemblies 43 pass through the flanges 39, 41 to secure the sections 5, 7 together along the opposite lateral margins thereof.

The sections 5, 7 are of similar construction except that the section 7 has a hole offset from the boss 33 for receiving a grounding screw 45 at which an external ground wire 47 (FIG. 3) may be attached. In addition, the base section 7 has an inwardly projecting extension 49 that is offset from the bosses 33, 35, and for purposes presently more fully appearing.

As seen in FIG. 4 the base section 7 (and likewise section 5) has an enlarged central region 51 in each boss and forming part of the passageway or opening therein. The central region 51 has a series of circumferential inwardly projecting ribs 53 which are axially spaced apart. These ribbed regions 51, 51 are larger in diameter than that of the cable 40 with which the splice case is used.

Between the bosses 33, 35 is a groove 55 and laterally of the respective bosses are additional grooves 57, 59. The corresponding grooves on the two sections cooperate when the sections 5, 7 are assembled to provide channels between the openings 32, 34 and laterally outwardly thereof for a suitable sealing material.

The opposite runs of a loop 38 of the main cable 40, extend through the openings 32, 34 such that the loop 38 extends beyond the base 4 and into the splicing chamber 8. The insulated core wires 42 of the loop 38 are exposed for splicing connection in the chamber 8 to paired service wires 44.

Telephone cables of the type used with the splice case usually have an inner insulating sheath 46 surrounding the core wires 42 and a metallic grounding shield 48 surrounding the inner sheath 46. An outer insulating sheath 50 surrounds the grounding shield 48.

In preparing the cable for assembly with the base 4, enough cable slack should be left at the installation site to permit the cable to be raised out of the trench or hole in which the cable and splice case are to be buried. Thus, a normal amount of ground heaving will not tend to stress the cable when the assembled cable and splice case are buried. The work of assembly of the cable and splice case may be carried out on a suitable temporary platform.

Initially the inner sheath 46, grounding shield 48, and outer sheath 50 are stripped from the requisite length of splicing loop 38. Thereafter, suitable lengths of outer sheath 50 and grounding shield 48 are longitudinally slit to provide a series of tabs 52, as best shown in FIGS. 5 and 6. Two adjacent tabs 52 are also cut away to form a slot 54 for purposes presently more fully appearing. A wrap of tape 56 may be applied to each cable run at the end or bases of the tabs 52.

Provided for cooperation with each cable run is an inner sheath clamp 58. The inner sheath clamp 58 surrounds the inner sheath 46 and is surrounded by the grounding shield 48 so as to be in electrical contact therewith. The tabs 52 may be folded back temporarily to permit the clamp 58 to be installed over the inner sheath 46. Also the outer surface of the clamp 58 may be roughened to enhance contact with the sheath 48. Integrally formed on the inner sheath clamp 58 are ears 60, 60 which project through the slot 54 and are turned back for engagement with the outer sheath 50. Thus, the formation of the tabs 52 and the slot 54 permits installation of the inner sheath clamps 58 within the grounding shield 48 and allows the ears 60, 60 to be on the outside of the cable. The sheath clamp 58 is of a resilient material so that it may be opened up by pulling apart the ears 60 to permit the clamp 58 to be slipped over the inner sheath 46. A tape wrap 62 may be applied over the tabs 52, leaving the ears 60 exposed, as shown in FIGS. 6 and 7.

The splice case assembly also includes an outer sheath clamp structure 64 having a clamp 66 and a clamp bracket 68. The clamp 66 and the clamp bracket 68 cooperate to provide side-by-side recess which surround the cable runs at the tape wraps 62 and with the ears 60 of the respective inner sheath clamps 58 engaging the inside surfaces of the clamp bracket 68, as best seen in FIG. 8. By this means an electrical connection is established from the grounding shield 48 to the clamp structure 64. A bolt 70 passes through the bracket 68 and is threaded into the clamp 66 for drawing the clamp 66 and bracket 68 together tightly around the runs of the cable and to insure a firm mechanical and electrical engagement of the ears 60 with the bracket 68.

After installing the clamp structure 64 onto the cable runs, a suitable sealing structure 65 may be applied around the tape wraps 56 in the portions of each wherein the tape wraps 56 will be within the regions 51, 51 of the openings 32, 34. The sealing structure 65 may include a sealing compound of known type and a tape wrap thereover which is firmly and sealingly gripped by the ribs 53. Some sealing compound may be on the outside of the tape wrap. Thus, for purposes of the present invention any suitable sealing arrangement of tape and/or sealing compound may be applied to the cable runs to fill up the clearance between the ribs 53 and the cable runs. The clamp structure 64 may now be attached to the base section 7.

The outer sheath clamp bracket 68 has an enlarged extension or flange 74 with a threaded hole 76 for receiving a bolt 78 by which the outer sheath clamp structure 64 may be rigidly secured to the base section 7. The bolt 78 also serves to secure a mounting bracket 80 and a grounding harness 82 (FIG. 9) to the base. The grounding harness 82 is connected to ground terminal 45. Thus a ground connection is provided from the metallic mounting bracket 80 and from the shield 48 through to the ground wire 47.

The bracket 80 may be a generally C-shaped member having one or more dielectric terminal boards 96 secured thereto, a fragmentary part of one such board 96 being shown in FIG. 9. The end of the bracket 80 that is remote from the base has an outwardly opening portion 98 that is covered with an insulating material and which receives and supports the core wires of the cable loop 38. Consequently, when the cover 6 is removed, the cable loop 38 and terminal board or boards 96 remain in place and are accessible for connecting or disconnecting the service wire pairs 44. In general, a selected pair of core wires from the loop 38 are connected to a pair of terminals on one of the terminal boards 96. The service wire pair is then electrically connected to those terminals to complete the service wire connection to the cable. Loading coils of other devices may be mounted on the terminal boards, as desired. Of course, the service wires may be directly spliced to the cable core wires, bypassing the terminal boards, if desired.

Each service wire pair 44 contains the individually insulated wires with a metallic grounding shield 100 (FIG. 9) surrounding the wire pair and a plastic insulating sheath 101 surrounding the metallic shield 100. This outer insulating sheath 101 may be stripped away over a short length in order to expose the shield 100 so that the service wire pair may be grounded through the mounting bracket 80. For this purpose, the mounting bracket has a grounding block 102 secured thereto as by screw 104. Screw 104 is also threaded into a movable block 106 which cooperates with the block 102 to form a generally rectangular opening at which the grounding shield 100 is clamped. Additional service wire block assemblies 102a may be provided for in any suitable manner on the bracket 80 for grounding the shields of each pair of service wires. This may be done by mounting on the bracket 80 an arcuate cross strap 107 that carries additional grounding clamp assemblies for other pairs of service wires.

Integrally formed on the base are tubular circumferentially disposed projections 108, there being six such projections (see FIG. 3) shown in the present form of the invention. Three projections are in each base section. Each projection provides a port for receiving a pair of service wires 44; however these tubular projections may be closed off and sealed when not in use. When a service wire pair 44 extends through a tubular projection 108, the service wire pair will also extend through aligned central openings in a sealing bushing 110, a spacer 112, and a gland nut 114, the latter being threaded onto the outer end of the projection 108. The bore of the tubular projection 108 includes a conical portion 116 so that upon tightening of the nut 114, the spacer 112 applies pressure to the bushing 110 forcing the latter against the conical surface 116. This causes the bushing to grip the outer sheath of the service wire pair and form a seal. If a tubular projection 108 is not in use, it may be sealed off by an inperforate bushing and an imperforate disc.

In assembling the base sections 5, 7 sealing compound of a suitable type is first introduced into the grooves 55, 57, 59. Then the two base sections may be placed together and the bolt and nut assemblies 43 installed and tightened. A seal is thus formed at the juncture of the base sections and between the openings 32, 34 by the sealing compound in the mating grooves 55 of the two sections. Likewise, a seal is formed laterally of the openings 32, 34 by the sealing compound in the respective mating grooves 57, 57 and 59, 59. This arrangement along with the sealing structure 65 forms an effective seal yet permits the base sections to be separated for replacement of the cable.

The splice case assembly may be used pressurized or unpressurized. In the former situation, gas is introduced into the splicing chamber 8 through a valve 120 in the cover 6. Gas pressure is, of course, applied only after the cover 6 has been sealingly clamped in place.

The invention is claimed as follows:

1. A buried-type splice case comprising a dielectric base having a pair of spaced openings for receiving the opposite runs of a loop of cable that has a metallic grounding shield and an insulating sheath surrounding the grounding shield and an insulating sheath surrounding the grounding shield said base being split along a parting region that passes substantially through the centers of said openings to provide cooperating base sections, said base sections having additional openings for receiving service wires, means sealing said pair of openings and additional openings with the cable and service wires extending therethrough, said base sections cooperating to provide grooves at the parting region receiving sealing material, there being grooves laterally outwardly of said pair of spaced openings and a groove intermediate said pair of openings, means outwardly of said outward grooves clamping the base sections together, means secured to said base for grounding the metallic shield on the cable; said grounding means including an inner clamp surrounded by the grounding shield and projecting therethrough, and an outer clamp engaging the inner clamp and said insulating sheath; and bracket means also mounted on said base supporting the loop of cable remote from said base.

2. A buried-type splice case according to claim 1 including ribs on the walls of said pair of spaced openings, and sealing means disposed around each cable run and engaged by said ribs whereby to form the seals at said pair of spaced openings.

3. A buried-type splice case according to claim 1 further including a cover, and mesns peripherally and removably sealing the cover to said base to enclose said loop of cable.

4. A buried-type splice case comprising a dielectric case of moisture impervious material, said base having a pair of base sections each with adjacent recesses, the base sections being separably secured together such that the recesses form two adjacent openings receiving the opposite runs of a loop of cable having a metallic grounding sheath, an outer insulating sheath surrounding the grounding sheath, an inner insulating sheath surrounded by the grounding sheath, and core wires surrounded by the inner insulating sheath; inner sheath clamping means engaging the inside of said grounding sheath, outer sheath clamping means engaging the outer sheath and said inner sheath clamping means, said outer sheath clamping means comprising opposed cooperating members that provide side-by-side recesses surrounding the cable runs, means drawing said members together and tightly around the cable runs and providing a firm mechanical and electrical contact of said outer sheath clamping means with said inner sheath clamping means, means securing said outer sheath clamping means to one of said base sections, said securing means providing a connection for grounding said sheath through said outer sheath clamping means, a bracket in conductive connection with said outer sheath clamping means and having an end remote from said base supporting the core wires of the loop of cable, said base sections each having additional openings receiving service wires for splicing with said core wires, said service wires having a grounding shield, means forming a ground connection between the service wire shield and said bracket, means sealing said two adjacent openings and said additional openings, means forming a seal at the juncture of said base sections, and a cover removably attached to said base and enclosing the core wires of the loop of cable.

5. A buried-type splice according to claim 4 in which the means forming the seal at the juncture of the two sections including grooves at said juncture, and sealing material in said grooves.

* * * * *

UNITED STATES PATENT OFFICE
CERTIFICATE OF CORRECTION

Patent No. 3,728,467          Dated April 17, 1973

Inventor(s) Milton A. Klayum and Chester E. Pierchala

It is certified that error appears in the above-identified patent and that said Letters Patent are hereby corrected as shown below:

Col. 3, line 12, change "tuned" to --turned--;
Col. 4, line 14, change "end" to --ends--;
Col. 4, line 40, change "recess" to --recesses--;
Col. 6, line 27-28, delete "and an insulating sheath surrounding the grounding shield";
Col. 6, line 34, insert --said-- before "additional";
Col. 6, line 54, change "mesns" to --means--;
Col. 6, line 61, change "case" to --base--;
Col. 8, line 12, insert --case-- after "splice";
Col. 8, line 14, change "including" to --includes--;

Signed and sealed this 8th day of January 1974.

(SEAL)
Attest:

EDWARD M. FLETCHER, JR.      RENE D. TEGTMEYER
Attesting Officer            Acting Commissioner of Patents